Patented Sept. 2, 1924.

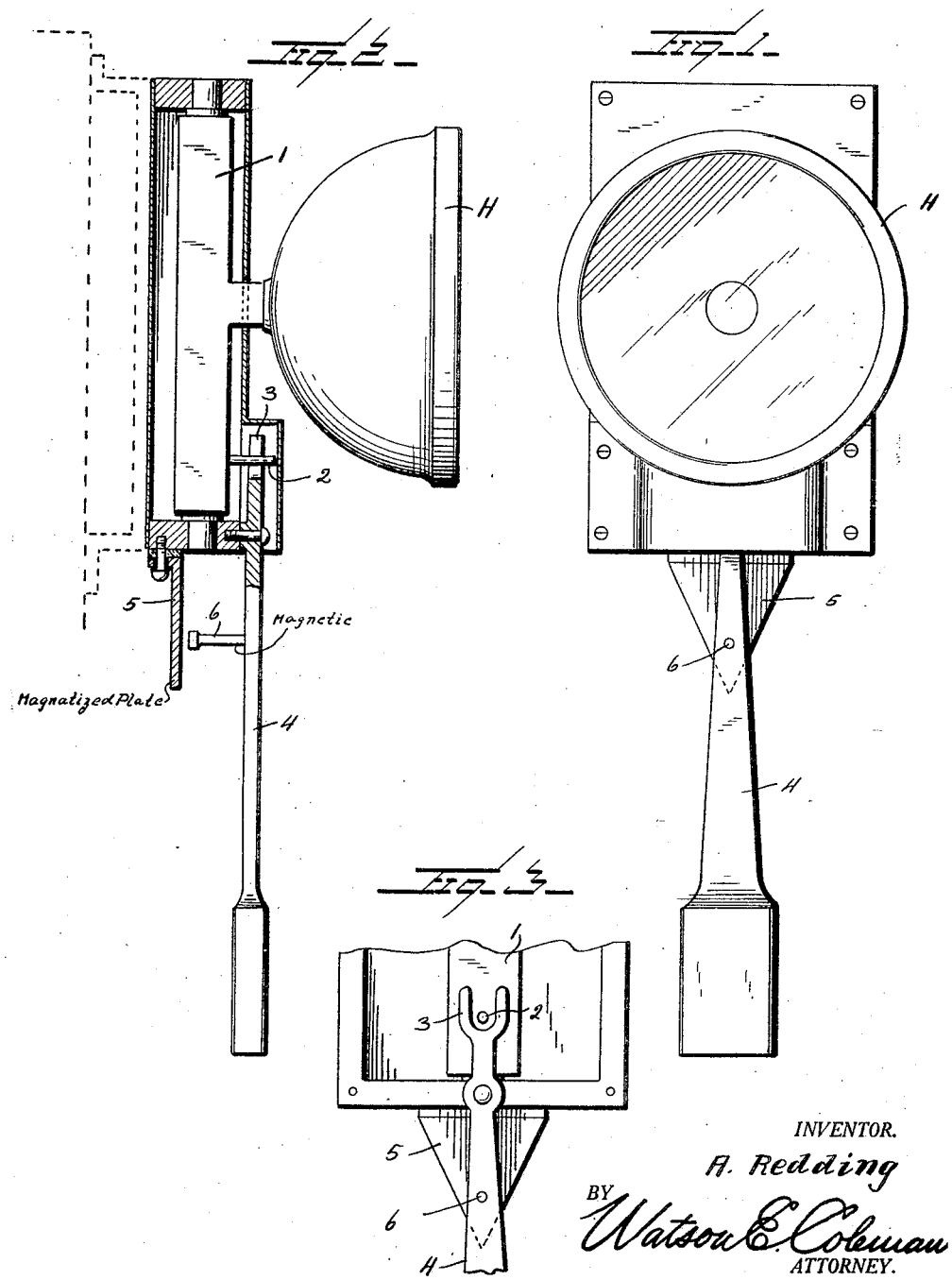

1,507,203

UNITED STATES PATENT OFFICE.

ANDERSON REDDING, OF JULIETTE, GEORGIA, ASSIGNOR OF ONE-HALF TO JAMES T. BRAY, OF JULIETTE, GEORGIA.

HEADLIGHT.

Application filed May 9, 1923. Serial No. 637,851.

*To all whom it may concern:*

Be it known that I, ANDERSON REDDING, a citizen of the United States, residing at Juliette, in the county of Monroe and State of Georgia, have invented certain new and useful Improvements in Headlights, of which the following is a specification, reference being had to the accompanying drawings.

This invention relates to certain improvements in headlights and it is an object of the invention to provide novel and improved means whereby the headlight will maintain the proper relation to the path of travel of the vehicle and especially when making a turn.

Another object of the invention is to provide novel and improved means whereby the headlight is caused automatically to swing in the direction in which the vehicle may turn together with magnetic means for increasing the efficiency of the headlight in casting its rays with respect to the vehicle.

The invention consists in the details of construction and in the combination and arrangement of the several parts of my improved headlight whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is an elevational view of a headlight constructed in accordance with an embodiment of my invention;

Figure 2 is a view partly in section and partly in elevation of the device as illustrated in Figure 1; and Figure 3 is a fragmentary view in elevation illustrating the operative connection between the pendulum and the supporting member for the headlight.

As disclosed in the accompanying drawings, 1 denotes a vertically disposed member supported for swinging movement in a horizontal direction at the forward end portion of a vehicle such as a locomotive, automobile or the like. Secured to the member 1 is the headlight H, said headlight being adapted to swing from side to side in accordance with the turning movement of the member 1.

The lower portion of the member 1 is provided with an outstanding pin 2 which extends between the upstanding spaced fingers 3 arranged at the upper end portion of the pendulum 4.

When the vehicle is traveling straight ahead the pendulum is substantially a dead center whereby the headlight H is in a position to throw its rays straight ahead but when the vehicle makes a turn the force of said turn will cause the pendulum to swing in a direction to throw or turn the lamp in the same direction as the turn whereby the rays of the headlight are maintained directly in advance of the vehicle during such turning movement.

Positioned rearwardly of the pendulum 4 is a magnetized plate 5 and carried by the pendulum 4 and terminating in close proximity to the plate 5 is a magnetic member 6. When the vehicle is traveling straight ahead and the pendulum 4 is substantially a dead center the plate 5 coacts with the member 6 to hold the pendulum against swinging movement but upon the force created upon turning of the vehicle, the magnetic field will permit the pendulum to have requisite swinging movement. The plate 5 also coacts with the member 6 to momentarily hold the pendulum when the same has reached the limit of its outward swinging movement whereby the requisite illumination by the headlight in advance of the vehicle is assured.

From the foregoing description it is thought to be obvious that a headlight constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

In combination, a vertically disposed member, means for supporting the same for swinging movement in a horizontal direction, an illuminating means carried by the member, an outstanding pin carried by the member, a pendulum supported for swinging movement and provided with spaced fingers between which the pin of the member extends, an outstanding magnetic member carried by the pendulum, and a stationary magnetic plate positioned adjacent to the pendulum and in close proximity to the magnetic member.

In testimony whereof I hereunto affix my signature.

ANDERSON REDDING.